(12) United States Patent
Kim et al.

(10) Patent No.: US 11,297,076 B2
(45) Date of Patent: Apr. 5, 2022

(54) APPARATUS FOR DETECTING IN-VEHICLE EXTERNAL DATA INTRUSION BY COMPARING MULTIPLE INFORMATION ENTROPY AND OPERATING METHOD THEREOF

(71) Applicant: Industry-Academic Cooperation Foundation, Chosun University, Gwangju (KR)

(72) Inventors: Young Sik Kim, Gwangju (KR); Kwang Sik Kim, Gwangju (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 236 days.

(21) Appl. No.: 16/721,934

(22) Filed: Dec. 20, 2019

(65) Prior Publication Data
US 2020/0382528 A1 Dec. 3, 2020

(30) Foreign Application Priority Data
May 27, 2019 (KR) .......................... 10-2019-0062011

(51) Int. Cl.
*H04L 9/40* (2022.01)
*H04L 67/12* (2022.01)
(Continued)

(52) U.S. Cl.
CPC .......... *H04L 63/1416* (2013.01); *H04L 12/40* (2013.01); *H04L 63/126* (2013.01);
(Continued)

(58) Field of Classification Search
CPC . H04L 63/1416; H04L 67/12; H04L 63/1425; H04L 63/126; H04L 63/1466;
(Continued)

(56) References Cited

U.S. PATENT DOCUMENTS 10,298,612 B2 * 5/2019 Galula ................ H04L 63/1425
2016/0308887 A1  10/2016 Jung et al.

FOREIGN PATENT DOCUMENTS

KR    10-1638613 B1     7/2016
KR   101638613 B1 *    7/2016 ........... G06F 21/552
(Continued)

OTHER PUBLICATIONS

Wang et al., An Entropy Analysis Based Intrusion Detection System for Controller Area Network in Vehicles, 2018 31st IEEE International System-on-Chip Conference (SOCC), pp. 90-95. (Year: 2018).*
(Continued)

*Primary Examiner* — Daniel B Potratz
*Assistant Examiner* — Wansik You
(74) *Attorney, Agent, or Firm* — Park, Kim & Suh, LLC

(57) ABSTRACT

Disclosed are an apparatus for detecting in-vehicle external data intrusion by comparing multiple information entropy and a method of operating the same. The present invention may prevent a danger due to in-vehicle external data intrusion by providing a technology that may determine whether in-vehicle external data intrusion occurs by checking information entropy representing the amount of information for a package ID generable through an in-vehicle Controller Area Network (CAN) communication network.

13 Claims, 2 Drawing Sheets

(51) Int. Cl.
*H04L 12/40* (2006.01)
*H04L 29/06* (2006.01)

(52) U.S. Cl.
CPC ...... *H04L 63/1425* (2013.01); *H04L 63/1466* (2013.01); *H04L 67/12* (2013.01); *H04L 2012/40215* (2013.01); *H04L 2012/40273* (2013.01)

(58) Field of Classification Search
CPC .......... H04L 12/40; H04L 2012/40215; H04L 2012/40273; H04L 12/40045; H04L 63/1408; H04L 12/40104; H04L 12/40071; H04W 4/40; H04W 12/121
See application file for complete search history.

(56) References Cited

FOREIGN PATENT DOCUMENTS

| | | | |
|---|---|---|---|
| KR | 101638613 B2 * | 7/2016 | |
| KR | 10-2018-0021287 A | 3/2018 | |
| KR | 20180021287 A * | 3/2018 | |
| KR | 10-1857554 B1 | 5/2018 | |
| KR | 101857554 B1 * | 5/2018 | |

OTHER PUBLICATIONS

Wu et al., Sliding Window Optimized Information Entropy Analysis Method for Intrusion Detection on In-Vehicle Networks, 2018, IEEE Access vol. 6, p. 45233-45245. (Year: 2018).*
KR20180021287A—English Translation (Year: 2018).*
KR101857554B1—English Translation (Year: 2018).*
KR101638613B1—English translation (Year: 2016).*

* cited by examiner

APPARATUS FOR DETECTING IN-VEHICLE EXTERNAL DATA INTRUSION BY COMPARING MULTIPLE INFORMATION ENTROPY AND OPERATING METHOD THEREOF

CROSS-REFERENCE TO RELATED APPLICATIONS

This application claims priority to and the benefit of Korean Patent Application No. 10-2019-0062011 filed in the Korean Intellectual Property Office on May 27, 2019, the entire contents of which are incorporated herein by reference.

TECHNICAL FIELD

The present invention relates to an apparatus for detecting external data intrusion on a vehicle which is capable of transceiving data with other vehicles or external traffic facilities through a network, and a method of operating the same.

BACKGROUND ART

Recently, research on a connected car, which is equipped with a communication module ad is capable of transceiving data with other vehicles or external traffic facilities through a network, continues.

As interest in autonomous vehicles increases, a variety of the latest technologies applied to the autonomous vehicle are emerging.

The vehicle equipped with the advanced technology is equipped with various sensors to detect an environment around the vehicle in that the corresponding vehicle provides a function of determining a travelling environment by itself and determining whether to travel or stop and the like.

The sensors include a detection sensor for detecting whether an obstacle is present around a vehicle, a Global Positioning System (GPS) sensor for determining a current location of the vehicle, and the like, and when the detection sensor detects that an obstacle is present around the vehicle, the detection sensor outputs a sensing result value for inducing a deceleration of the vehicle, and when the detection sensor detects that an obstacle is not present around the vehicle, the detection sensor outputs a sensing result value for maintaining a speed or inducing acceleration of the vehicle.

For reference, as the detection sensors, an ultrasonic sensor for detecting an obstacle by using ultrasonic waves, an image detection sensor for tracing an object from an image captured by a camera and detecting an obstacle, a RAdio Detecting And Ranging (RADAR) sensor for detecting an obstacle by using radar, a Light Detection And Ranging (LiDAR) sensor for detecting an obstacle by using laser light, and the like are utilized.

The vehicles equipped with a network function receive various data from the outside, so that when data is artificially transmitted from the outside to disturb a control system of the vehicle, a problem may occur in the control of the vehicle which may pose a great threat to a driver.

For example, a manipulation is applied from the outside to various sensors equipped in a vehicle or an attack is applied to an Electronic Control Unit (ECU) of a vehicle to cause a driver to control a vehicle in a form that the driver does not want, so that there may occur a problem in that a severe traffic accident is caused.

Accordingly, there is a need for research on a technology for detecting whether data intrusion occurs on a vehicle equipped with a network function from the outside.

Under a certain travelling environment, the types of packets generated through an in-vehicle Controller Area Network (CAN) communication network occur in a similar pattern almost every time unless there is a problem in a vehicle, so that an occurrence probability of each kind of packet IDs generable through the CAN communication network for each travelling environment converges to a specific probability value. Accordingly, information entropy representing the amount of information associated with the occurrence probability of the packet ID generable through the CAN communication network under a specific travelling environment converges to a specific value. Herein, the information entropy refers to the quantification of the amount of information representing the degree of uncertainty for events having a specific probability.

According to the foregoing, in a vehicle in a normal state, the kind of packet ID generated for each specific travelling condition has a regular characteristic, so that the information entropy has a characteristic in converging to a predetermined value. However, when a predetermined packet starts to be inserted according to the occurrence of the external data intrusion on the inside of the vehicle by an attacker, an occurrence probability of each packet is changed to cause a change in the value of the information entropy.

Accordingly, there is a need for research on a method for preventing a danger due to in-vehicle external data intrusion by introducing a technology that may determine whether in-vehicle external data intrusion occurs through a check of information entropy representing the amount of information for a package ID generable through an in-vehicle CAN communication network.

SUMMARY OF THE INVENTION

The present invention has been made in an effort to prevent a danger due to in-vehicle external data intrusion by suggesting a technology that may determine whether in-vehicle external data intrusion occurs by checking information entropy representing the amount of information for a package ID generable through an in-vehicle Controller Area Network (CAN) communication network.

An exemplary embodiment of the present invention provides an apparatus for detecting in-vehicle external data intrusion by comparing multiple information entropy, the apparatus comprising: a reference entropy storage unit configured to store, for each of a plurality of predetermined different travelling environment conditions, an upper limit value and a lower limit value of predetermined first reference information entropy, an upper limit value and a lower limit value of predetermined second reference information entropy, and an upper limit value and a lower limit value of predetermined third reference information entropy for detecting external data intrusion on a vehicle; a travelling environment condition checking unit configured to check a control signal associated with travelling of the vehicle by accessing an Electronic Control Unit (ECU) of the vehicle and check a current travelling environment condition of the vehicle; a count unit configured to collect N packets (N is a natural number equal to or larger than 2) sequentially generated through an in-vehicle Controller Area Network (CAN) communication network and generate a packet group formed of N packets, and count each of the number of times of occurrence of first overlapping event (which is the event generated when the two packets having the same ID are continuously generated through the CAN communication network), a second overlapping event (which is the event generated when the three packets having the same ID are continuously generated through the CAN communication network), and a third overlapping event (which is the event generated when the four packets having the same ID are continuously generated through the CAN communication network) by checking IDs allocated to the N packets forming the packet group; a criteria information entropy estimating unit configured to estimate first criteria information entropy representing the amount of information for the packet ID generable through the CAN communication network under the current travelling environment condition of the vehicle based on the number of times of the occurrence of the first overlapping event and the number of N packets forming the packet group, estimate second criteria information entropy representing the amount of information for the packet ID generable through the CAN communication network under the current travelling environment condition of the vehicle based on the number of times of the occurrence of the second overlapping event and the number of N packets forming the packet group, and estimate third criteria information entropy representing the amount of information for the packet ID generable through the CAN communication network under the current travelling environment condition of the vehicle based on the number of times of the occurrence of the third overlapping event and the number of N packets forming the packet group; an entropy checking unit configured to, when the first criteria information entropy, the second criteria information entropy, and the third criteria information entropy are estimated, check whether the first criteria information entropy belongs to values between the upper limit value and the lower limit value of the first reference information entropy stored in the reference entropy storage unit while corresponding to the travelling environment condition corresponding to the current travelling environment condition of the vehicle, check whether the second criteria information entropy belongs to values between the upper limit value and the lower limit value of the second reference information entropy stored in the reference entropy storage unit while corresponding to the travelling environment condition corresponding to the current travelling environment condition of the vehicle, and check whether the third criteria information entropy belongs to values between the upper limit value and the lower limit value of the third reference information entropy stored in the reference entropy storage unit while corresponding to the travelling environment condition corresponding to the current travelling environment condition of the vehicle; and an external data intrusion determining unit configured to, when it is checked that any one of the first criteria information entropy, the second criteria information entropy, and the third criteria information entropy does not belong to the values between the upper limit value and the lower limit values of the first reference information entropy, the second reference information entropy, and the third reference information entropy stored while corresponding to the travelling environment condition corresponding to the current travelling environment condition of the vehicle, determine that the external data intrusion occurs on the vehicle.

Another exemplary embodiment of the present invention provides a method of operating an apparatus for detecting in-vehicle external data intrusion by comparing multiple information entropy, the method including: maintaining a reference entropy storage unit in which for each of a plurality of predetermined different travelling environment conditions, an upper limit value and a lower limit value of predetermined first reference information entropy, an upper limit value and a lower limit value of predetermined second reference information entropy, and an upper limit value and a lower limit value of predetermined third reference information entropy for detecting external data intrusion on a vehicle are stored; checking a control signal associated with travelling of the vehicle by accessing an Electronic Control Unit (ECU) of the vehicle and checking a current travelling environment condition of the vehicle; collecting N packets (N is a natural number equal to or larger than 2) sequentially generated through an in-vehicle Controller Area Network (CAN) communication network and generating a packet group formed of N packets, and counting each of the number of times of occurrence of first overlapping event (which is the event generated when the two packets having the same ID are continuously generated through the CAN communication network), a second overlapping event (which is the event generated when the three packets having the same ID are continuously generated through the CAN communication network), and a third overlapping event (which is the event generated when the four packets having the same ID are continuously generated through the CAN communication network) by checking IDs allocated to the N packets forming the packet group; estimating first criteria information entropy representing the amount of information for the packet ID generable through the CAN communication network under the current travelling environment condition of the vehicle based on the number of times of the occurrence of the first overlapping event and the number of N packets forming the packet group, estimating second criteria information entropy representing the amount of information for the packet ID generable through the CAN communication network under the current travelling environment condition of the vehicle based on the number of times of the occurrence of the second overlapping event and the number of N packets forming the packet group, and estimating third criteria information entropy representing the amount of information for the packet ID generable through the CAN communication network under the current travelling environment condition of the vehicle based on the number of times of the occurrence of the third overlapping event and the number of N packets forming the packet group; when the first criteria information entropy, the second criteria information entropy, and the third criteria information entropy are estimated, checking whether the first criteria information entropy belongs to values between the upper limit value and the lower limit value of the first reference information entropy stored in the reference entropy storage unit while corresponding to the travelling environment condition corresponding to the current travelling environment condition of the vehicle, checking whether the second criteria information entropy belongs to values between the upper limit value and the lower limit value of the second reference information entropy stored in the reference entropy storage unit while corresponding to the travelling environment condition corresponding to the current travelling environment condition of the vehicle, and checking whether the third criteria information entropy belongs to values between the upper limit value and the lower limit value of the third reference information entropy stored in the reference entropy storage unit while corresponding to the travelling environment condition corresponding to the current travelling environment condition of the vehicle; and when it is checked that any one of the first criteria information entropy, the second criteria information entropy, and the third criteria information entropy does not belong to the values between the upper limit value and the lower limit values of the first reference information entropy, the second reference information entropy, and the third reference information entropy stored while corresponding to the travelling environment condition corresponding to the current travelling environment condition of the vehicle, determining that the external data intrusion occurs on the vehicle.

The present invention may prevent a danger due to in-vehicle external data intrusion by providing a technology that may determine whether in-vehicle external data intrusion occurs by checking information entropy representing the amount of information for a package ID generable through an in-vehicle Controller Area Network (CAN) communication network.

DETAILED DESCRIPTION

Figure 1:
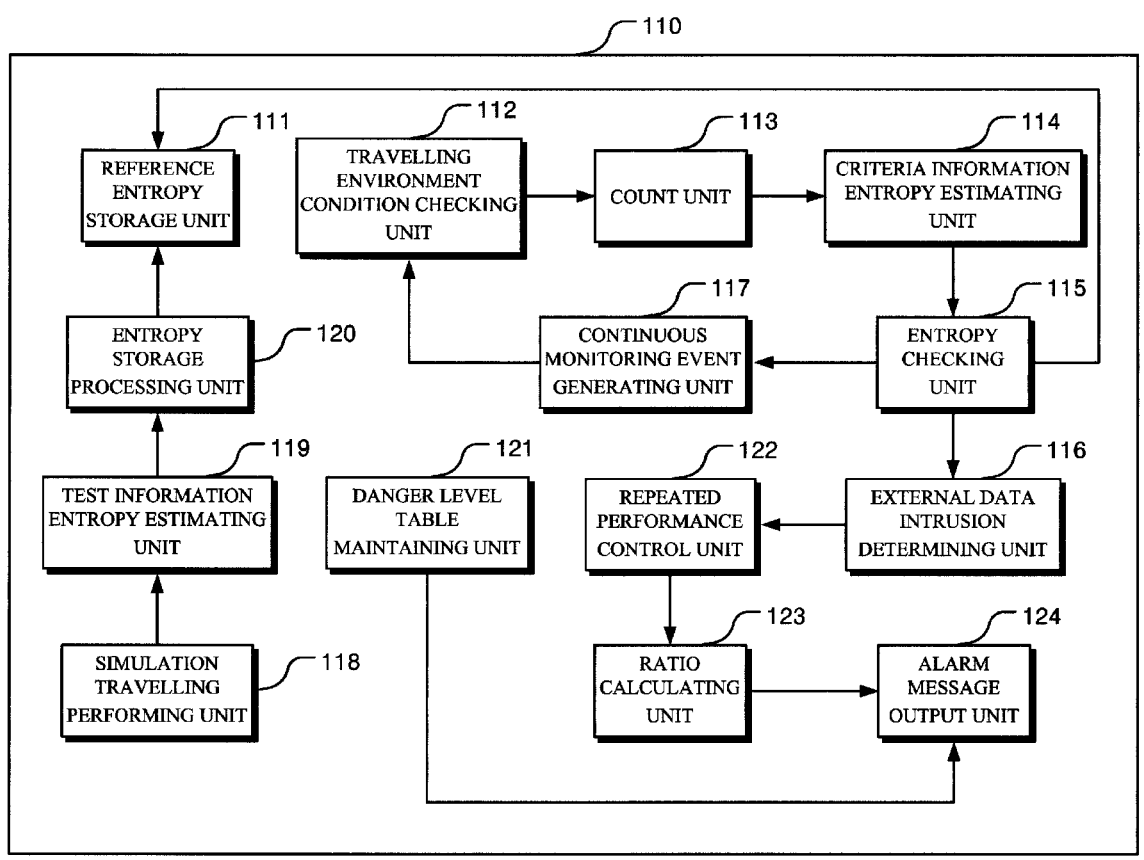
FIG. 1 is a diagram illustrating a structure of an apparatus for detecting in-vehicle external data intrusion by comparing multiple information entropy according to an exemplary embodiment of the present invention.

Hereinafter, exemplary embodiments according to the present invention will be described in detail with reference to the accompanying drawings. The description is not intended to limit the present invention to the specific exemplary embodiments, and it will be appreciated that the present invention includes all modifications, equivalences, or substitutions included in the spirit and the technical scope of the present invention. In describing each drawing, similar reference numerals are used for similar constituent elements, and all terms used herein including technical or scientific terms have the same meanings as meanings which are generally understood by those skilled in the art unless they are differently defined.

In the present specification, unless explicitly described to the contrary, the word "comprise" and variations such as "comprises" or "comprising", will be understood to imply the inclusion of stated elements but not the exclusion of any other elements. Further, in various exemplary embodiments of the present invention, the respective constituent elements, functional blocks, or means may be formed or one or more sub constituent elements, and electric, electronic, and mechanical functions performed by the respective constituent elements may be implemented by publicly known various elements or mechanical elements, such as an electronic circuit, an integrated circuit, and an Application Specific Integrated Circuit (ASIC), and may also be separately implemented or two or more of the electric, electronic, and mechanical functions may be implemented while being combined into one.

In the meantime, the blocks of the accompanying block diagram or the operations of the flowchart may be interpreted to mean computer program instructions mounted in a processor or a memory of data processable equipment, such as a general-purpose computer, a specific-purpose computer, a portable notebook computer, and a network computer, and performing designated functions. The computer program commands may be stored in a memory provided in a computer device or a computer readable memory, so that the functions described in the blocks of the accompanying block diagram or the operations of the flowchart may also be produced as products including instruction means performing the functions. Further, each block or each operation may represent a part of a module, a segment, or a code including one or more executable commands for executing a specific logical function(s). Further, it should be noted that in some alternative exemplary embodiments, functions mentioned in the blocks or operations may also be executed in a different order. For example, two blocks or operations illustrated in succession may be performed substantially concurrently or in the reverse order, and in some cases, some blocks or operations may also be omitted.

FIG. 1 is a diagram illustrating a structure of an apparatus for detecting in-vehicle external data intrusion by comparing multiple information entropy according to an exemplary embodiment of the present invention.

Referring to FIG. 1, an apparatus 110 for detecting in-vehicle external data intrusion by comparing multiple information entropy according to an exemplary embodiment of the present invention includes a reference entropy storage unit 111, a travelling environment condition checking unit 112, a count unit 113, a criteria information entropy estimating unit 114, an entropy checking unit 115, and an external data intrusion determining unit 116.

In the reference entropy storage unit 111, an upper limit value and a lower limit value of predetermined first reference information entropy, an upper limit value and a lower limit value of predetermined second reference information entropy, and an upper limit value and a lower limit value of predetermined third reference information entropy for detecting external data intrusion on a vehicle, for each of a plurality of predetermined different travelling environment conditions, are stored.

Herein, the plurality of travelling environment conditions may be a travelling environment condition in which the amount of variation of a predetermined acceleration is matched to each of a predetermined speed section. In relation to this, the plurality of travelling environment conditions may be divided as represented in Table 1 below.

TABLE 1

| Travelling environment condition | Speed section | Amount of variation of acceleration |
|---|---|---|
| Travelling environment condition 1 | 0 to 20 km/h | −1 km/s² to +1 km/s² |
| Travelling environment condition 2 | 0 to 20 km/h | −2 km/s² to +2 km/s² |
| Travelling environment condition 3 | 20 to 40 km/h | −2 km/s² to +2 km/s² |
| ... | ... | ... |

For example, "Travelling environment condition 1" in Table 1 refers to a travelling environment condition in which when a speed of vehicle is "0 to 20 km/h", the amount of variation of an acceleration of the vehicle has a value of −1 km/s² to +1 km/s².

In this case, in the reference entropy storage unit 111, for each of the plurality of different traveling environment conditions represented in Table 1, the upper limit value and the lower limit value for the predetermined first reference information entropy, the upper limit value and the lower limit value for the predetermined second reference information entropy, and the upper limit value and the lower limit value for the predetermined third reference information entropy for detecting external data intrusion on the vehicle may have been stored.

In this case, according to the exemplary embodiment of the present invention, the apparatus 110 for detecting in-vehicle external data intrusion is the configuration for determining the upper limit values and the lower limit values of the first reference information entropy, the second reference information entropy, and the third reference information entropy for each travelling environment condition to be stored in the entropy storage unit 111, and may further include a simulation travelling performing unit 118, a test information entropy estimating unit 119, and an entropy storage processing unit 120.

The simulation travelling performing unit 118 repeatedly perform simulation travelling according to each of the plurality of travelling environment conditions on the vehicle as many as the predetermined number of times of a training by applying a control signal to an Electronic Control Unit (ECU) of the vehicle so as to have a travelling environment according to each of the plurality of travelling environment conditions.

In relation to this, in the case where the predetermined number of times of the training is "100", the simulation travelling performing unit 118 may control the vehicle to perform simulation travelling 100 times according to each of the plurality of travelling environment conditions by applying a control signal 100 times to the ECU of the vehicle so as to have a travelling environment according to the travelling environment condition represented in Table 1 for each travelling environment condition.

The test information entropy estimating unit 119 counts the total number of plurality of packets sequentially generated through the in-vehicle CAN communication network inside the vehicle and the number of times of occurrence of a first overlapping event, a second overlapping event, and a third overlapping event generated for the plurality of packets whenever the simulation travelling is repeatedly performed the predetermined number of times of the training for each of the plurality of travelling environment conditions to estimate first for-test information entropy representing the amount of information for a packet ID generable through the CAN communication network according to each of the plurality of travelling environment conditions based on the number of times of the occurrence of the first overlapping event, estimate second for-test information entropy representing the amount of information for a packet ID generable through the CAN communication network according to each of the plurality of travelling environment conditions based on the number of times of the occurrence of the second overlapping event, and estimate third for-test information entropy representing the amount of information for a packet ID generable through the CAN communication network according to each of the plurality of travelling environment conditions based on the number of times of the occurrence of the third overlapping event.

Herein, the first overlapping event refers to the event occurring when two packets having the same ID are continuously generated through the CAN communication network, the second overlapping event refers to the event occurring when three packets having the same ID are continuously generated through the CAN communication network, and the third overlapping event refers to the event occurring when four packets having the same ID are continuously generated through the CAN communication network.

For example, when it is assumed that the total of 10 packets is sequentially generated, and an ID of the third packet corresponds to an ID of the second packet and an ID of the fifth packet corresponds to an ID of the fourth packet, it can be determined that the first overlapping event occurs a total of two times.

When it is assumed that the total of 10 packets is sequentially generated, and an ID of the fourth packet, an ID of the third packet, and an ID of the second packet correspond to one another, it can be determined that the second overlapping event occurs a total of one time.

Last, when it is assumed that the total of 10 packets is sequentially generated, and an ID of the fifth packet, an ID of the fourth packet, an ID of the third packet, and an ID of the second packet correspond to one another, it can be determined that the third overlapping event occurs a total of one time.

In this case, the test information entropy estimating unit 119 may estimate the first for-test information entropy by performing a calculation according to Equation 1 below.

$$R_{t1} = -\log_2 \frac{C_1}{L} \qquad [\text{Equation 1}]$$

Herein, $R_{t1}$ refers to the first for-test information entropy estimated when the simulation travelling is performed one time under a specific travelling environment condition, L refers to the total number of packets generated when the simulation travelling is performed one time under the corresponding travelling environment condition, and $C_1$ refers to the number of times of the occurrence of the first overlapping event generated when the simulation travelling is performed one time under the corresponding travelling environment condition.

When there are N events having a specific probability distribution and an overlapping event in which the event overlaps occurs C times as a result of the sequential performance of an execution for generating the event L times, $$-\log_2 \frac{C}{L}$$

has a characteristic of converging to Renyi Entropy that is one of the kinds of information entropy representing the amount of information for the N events. Especially, as the value of L is larger, $$-\log_2 \frac{C}{L}$$

converges to the almost same value as that of the Renyi Entropy. The Renyi Entropy is a generalized concept including the well-known Shannon Entropy and Min-Entropy as a special case, and is a well-defined mathematical concept of detecting the amount of variation in a flow pattern of data inside the vehicle, like the Shannon Entropy.

Accordingly, when the total of L packets is sequentially generated and the first overlapping event occurs a total of $c_1$ times as the result of the performance of the simulation travelling one time under the specific travelling environment condition, $R_{t1}$ calculated by Equation 1 converges to the Renyi Entropy representing the amount of information for the packet ID generable under the corresponding travelling environment condition, so that the test information entropy estimating unit 119 repeatedly performs the simulation travelling the predetermined number of times of the training under each of the plurality of travelling environment conditions and performs the calculation according to Equation 1 in each performance of the simulation travelling to estimate the first for-test information entropy.

In relation to this, when it is assumed that the predetermined number of times of the training is "100" and there are "Travelling environment condition 1" and "Travelling environment condition 2" as the plurality of travelling environment conditions, the test information entropy estimating unit 119 may estimate the 100 first for-test information entropy under "Travelling environment condition 1" and estimate the 100 first for-test information entropy under "Travelling environment condition 2" through the calculation according to Equation 1.

According to the exemplary embodiment of the present invention, the test information entropy estimating unit 119 may estimate the second for-test information entropy by performing the calculation according to Equation 2 below.

$$R_{t2} = -\log_2 \frac{C_2}{L} \quad \text{[Equation 2]}$$

Herein, $R_{t2}$ refers to the second for-test information entropy estimated when the simulation travelling is performed one time under a specific travelling environment condition, L refers to the total number of packets generated when the simulation travelling is performed one time under the corresponding travelling environment condition, and $C_2$ refers to the number of times of the occurrence of the second overlapping event generated when the simulation travelling is performed one time under the corresponding travelling environment condition.

According to the exemplary embodiment of the present invention, the test information entropy estimating unit 119 may estimate the third for-test information entropy by performing the calculation according to Equation 3 below.

$$R_{t3} = -\log_2 \frac{C_3}{L} \quad \text{[Equation 3]}$$

Herein, $R_{t3}$ refers to the third for-test information entropy estimated when the simulation travelling is performed one time under a specific travelling environment condition, L refers to the total number of packets generated when the simulation travelling is performed one time under the corresponding travelling environment condition, and $C_3$ refers to the number of times of the occurrence of the third overlapping event generated when the simulation travelling is performed one time under the corresponding travelling environment condition.

The entropy storage processing unit 120 may check maximum values and minimum values of the first for-test information entropy, the second for-test information entropy, and the third for-test information entropy repeatedly estimated by the predetermined number of times of the training for each of the plurality of travelling environment conditions, and correspond the maximum value and the minimum value of the first for-test information entropy checked for each of the plurality of travelling environment conditions to the upper limit value and the lower limit value of the first reference information entropy for each of the plurality of travelling environment conditions and store the maximum value and the minimum value of the first for-test information entropy in the reference entropy storage unit 111, correspond the maximum value and the minimum value of the second for-test information entropy checked for each of the plurality of travelling environment conditions to the upper limit value and the lower limit value of the second reference information entropy for each of the plurality of travelling environment conditions and store the maximum value and the minimum value of the second for-test information entropy in the reference entropy storage unit 111, and correspond the maximum value and the minimum value of the third for-test information entropy checked for each of the plurality of travelling environment conditions to the upper limit value and the lower limit value of the third reference information entropy for each of the plurality of travelling environment conditions and store the maximum value and the minimum value of the third for-test information entropy in the reference entropy storage unit 111.

In relation to this, like the foregoing example, when the test information entropy estimating unit 119 estimates the 100 first for-test information entropy, the 100 second for-test information entropy, and the 100 third for-test information entropy under "Travelling environment condition 1" and estimates the 100 first for-test information entropy, the 100 second for-test information entropy, and the 100 third for-test information entropy under "Travelling environment condition 2" according to the assumption that the predetermined number of times of the training is "100" and there are "Travelling environment condition 1" and "Travelling environment condition 2" as the plurality of travelling environment conditions, the entropy storage processing unit 120 may determine the maximum values and the minimum values among the 100 first for-test information entropy, the 100 second for-test information entropy, and the 100 third for-test information entropy estimated under "Travelling environment condition 1" as the upper limit values and the lower limit values of the first, second, and third reference information entropy for under "Travelling environment condition 1" and store the maximum values and the minimum values in the reference entropy storage unit 111, and determine the maximum values and the minimum values among the 100 first for-test information entropy, the 100 second for-test information entropy, and the 100 third for-test information entropy estimated under "Travelling environment condition 2" as the upper limit values and the lower limit values of the first, second, and third reference information entropy for under "Travelling environment condition 2" and store the maximum values and the minimum values in the reference entropy storage unit 111.

When the upper limit values and the lower limit values of the first, second, and third reference information entropy for detecting external data intrusion on the vehicle under each of the plurality of travelling environment conditions are completely stored in the reference entropy storage unit 111, the apparatus 110 for detecting in-vehicle external data intrusion may progress a process for determining whether external data intrusion occurs on the vehicle.

In relation to this, first, the travelling environment condition checking unit 112 checks a control signal associated with the travelling of the vehicle by accessing the ECU of the vehicle to check a current travelling environment condition of the vehicle.

The count unit 113 collects N packets (N is a natural number equal to or larger than 2) sequentially generated through the CAN communication network inside the vehicle and generates a packet group formed of N packets, and counts each of the number of times of the occurrence of the first overlapping event (which is the event generated when the two packets having the same ID are continuously generated through the CAN communication network), the second overlapping event (which is the event generated when the three packets having the same ID are continuously generated through the CAN communication network), and the third overlapping event (which is the event generated when the four packets having the same ID are continuously generated through the CAN communication network) by checking IDs allocated to the N packets forming the packet group.

The criteria information entropy estimating unit 114 estimates first criteria information entropy representing the amount of information for the packet ID generable through the CAN communication network under the current travelling environment condition of the vehicle based on the number of times of the occurrence of the first overlapping event and the number of N packets forming the packet group, estimates second criteria information entropy representing the amount of information for the packet ID generable through the CAN communication network under the current travelling environment condition of the vehicle based on the number of times of the occurrence of the second overlapping event and the number of N packets forming the packet group, and estimates third criteria information entropy representing the amount of information for the packet ID generable through the CAN communication network under the current travelling environment condition of the vehicle based on the number of times of the occurrence of the third overlapping event and the number of N packets forming the packet group.

In this case, according to the exemplary embodiment of the present invention, the criteria information entropy estimating unit 114 may estimate the first criteria information entropy based on a calculation according to Equation 4 below, estimate the second criteria information entropy based on a calculation according to Equation 5 below, and estimate the third criteria information entropy based on a calculation according to Equation 6 below.

$$R_1 = -\log_2 \frac{S_1}{n_1} \quad \text{[Equation 4]}$$

$$R_2 = -\log_2 \frac{S_2}{n_1} \quad \text{[Equation 5]}$$

$$R_3 = -\log_2 \frac{S_3}{n_1} \quad \text{[Equation 6]}$$

Herein, $R_1$ refers to the first criteria information entropy, $S_1$ refers to the number of times of the occurrence of the first overlapping event, $n_1$ refers to the number of N packets forming the packet group, $R_2$ refers to the second criteria information entropy, $S_2$ refers to the number of times of the occurrence of the second overlapping event, $n_1$ refers to the number of N packets forming the packet group, and $R_3$ refers to the third criteria information entropy, $S_3$ refers to the number of times of the occurrence of the third overlapping event, and $n_1$ refers to the number of N packets forming the packet group.

As described above, when there are the N events having the specific probability distribution and the overlapping event in which the event overlaps occurs C times as the result of the performance of the sequential execution for incurring the event L times, $$-\log_2 \frac{C}{L}$$

has the characteristic of converging to the Renyi Entropy that is one of the kinds of information entropy for representing the amount of information for the N events, so that the criteria information entropy estimating unit 114 may estimate the Renyi Entropy representing the amount of information for the packet ID generable through the CAN communication network by counting $S_1$, $S_2$, and $S_3$ which are the numbers of times of the occurrence of the first, second, and third overlapping events from the N packets checked under the current travelling environment condition of the vehicle and performing the calculations according to Equations 4, 5, and 6, and determine the estimated values as the first, second, and third criteria information entropy.

When the first criteria information entropy, the second criteria information entropy, and the third criteria information entropy are estimated, the entropy checking unit 115 checks whether the first criteria information entropy belongs to values between the upper limit value and the lower limit value of the first reference information entropy stored in the reference entropy storage unit 111 while corresponding to the travelling environment condition corresponding to the current travelling environment condition of the vehicle, checks whether the second criteria information entropy belongs to values between the upper limit value and the lower limit value of the second reference information entropy stored in the reference entropy storage unit 111 while corresponding to the travelling environment condition corresponding to the current travelling environment condition of the vehicle, and checks whether the third criteria information entropy belongs to values between the upper limit value and the lower limit value of the third reference information entropy stored in the reference entropy storage unit 111 while corresponding to the travelling environment condition corresponding to the current travelling environment condition of the vehicle.

When it is checked that any one of the first criteria information entropy, the second criteria information entropy, and the third criteria information entropy does not belong to the values between the upper limit value and the lower limit values of the first reference information entropy, the second reference information entropy, and the third reference information entropy stored while corresponding to the travelling environment condition corresponding to the current travelling environment condition of the vehicle, the external data intrusion determining unit 116 determines that the external data intrusion occurs on the vehicle.

That is, the upper limit values and the lower limit values of the first, second, and third reference information entropy according to each travelling environment condition stored in the reference entropy storage unit 111 are the values corresponding to the case of the normal travelling situation, so that when it is checked that the first, second, and third criteria information entropy calculated under the current travelling environment condition does not belong to the values between the upper limits and the lower limits of the first, second, and third reference information entropy stored in the reference entropy storage unit 111, the external data intrusion determining unit 116 may determine that the external data intrusion occurs on the vehicle.

In this case, according to the exemplary embodiment of the present invention, the apparatus 110 for detecting in-vehicle external data intrusion may further include a continuous monitoring event generating unit 117.

When it is checked that any one of the first criteria information entropy, the second criteria information entropy, and the third criteria information entropy belongs to the values between the upper limit value and the lower limit values of the first reference information entropy, the second reference information entropy, and the third reference information entropy stored while corresponding to the travelling environment condition corresponding to the current travelling environment condition of the vehicle, the continuous monitoring event generating unit 117 generates a continuous monitoring event.

In this case, when the continuous monitoring event is generated, the travelling environment condition checking unit 112 checks the control signal associated with the travelling of the vehicle by accessing the ECU of the vehicle again to re-check the current travelling environment condition of the vehicle.

The count unit 113 may re-collect N packets additionally generated through the CAN communication network and regenerate a packet group formed of the re-collected N packets, and check IDs allocated to the N packets forming the regenerated packet group and count the number of times of the occurrence of each of the first overlapping event, the second overlapping event, and the third overlapping event again.

The criteria information entropy estimating unit 114 may re-estimate the first criteria information entropy representing the amount of information for the packet ID generable through the CAN communication network under the re-checked current travelling environment condition of the vehicle based on the re-counted number of times of the occurrence of the first overlapping event and the number of N packets forming the re-generated packet group, re-estimate the second criteria information entropy representing the amount of information for the packet ID generable through the CAN communication network under the re-checked current travelling environment condition of the vehicle based on the re-counted number of times of the occurrence of the second overlapping event and the number of N packets forming the re-generated packet group, and re-estimate the third criteria information entropy representing the amount of information for the packet ID generable through the CAN communication network under the re-checked current travelling environment condition of the vehicle based on the re-counted number of times of the occurrence of the third overlapping event and the number of N packets forming the re-generated packet group.

In this case, according to the exemplary embodiment of the present invention, the criteria information entropy estimating unit 114 may perform the re-estimation of the first criteria information entropy based on a calculation according to Equation 7 below, perform the re-estimation of the second criteria information entropy based on a calculation according to Equation 8 below, and perform the re-estimation of the third criteria information entropy based on a calculation according to Equation 9 below.

$$R_{1r} = -\log_2 \frac{wS_1 + S_{1r}}{\left(n_2 \times \frac{1}{1-w}\right)}$$ [Equation 7]

$$R_{2r} = -\log_2 \frac{wS_2 + S_{2r}}{\left(n_2 \times \frac{1}{1-w}\right)}$$ [Equation 8]

$$R_{3r} = -\log_2 \frac{wS_3 + S_{3r}}{\left(n_2 \times \frac{1}{1-w}\right)}$$ [Equation 9]

Herein, $R_{1r}$ refers to the re-estimated first criteria information entropy, $S_1$ refers to the number of times of the occurrence of the first overlapping event, $S_{1r}$ refers to the re-counted number of times of the occurrence of the first overlapping event, and $n_2$ refers to the number of N packets forming the re-generated packet group, $R_{2r}$ refers to the re-estimated second criteria information entropy, $S_2$ refers to the number of times of the occurrence of the second overlapping event, $S_{2r}$ refers to the re-counted number of times of the occurrence of the second overlapping event, and $n_2$ refers to the number of N packets forming the re-generated packet group, and $R_{3r}$ refers to the re-estimated third criteria information entropy, $S_3$ refers to the number of times of the occurrence of the third overlapping event, $S_{3r}$ refers to the re-counted number of times of the occurrence of the third overlapping event, and $n_2$ refers to the number of N packets forming the re-generated packet group, and w refers to a predetermined weighted value having a size between 0 to 1.

That is, the criteria information entropy estimating unit 114 estimates the Renyi Entropy by counting the numbers $S_{1r}$, $S_{2r}$, and $S_{3r}$ of times of the occurrence of the first, second, and third overlapping events in the N packets forming the re-generated packet group according to the calculation methods represented in Equations 4, 5, and 6, and as represented in Equations 7, 8, and 9, the criteria information entropy estimating unit 114 calculates calculation values based on the first, second, and third overlapping events counted from the total of 2N packets checked in the previous packet group and the re-generated packet group by additionally reflecting w that is the weighted value to the numbers $S_1$, $S_2$, and $S_3$ of times of the occurrence of the first, second, and third overlapping events counted in the previous packet group to perform the estimation of the Renyi Entropy, and determine the estimated Renyi Entropy as the re-estimated first, second, and third criteria information entropy.

In this case, when the first criteria information entropy, the second criteria information entropy, and the third criteria information entropy are re-estimated, the entropy checking unit 115 checks whether the re-estimated first criteria information entropy belongs to the values between the upper limit value and the lower limit value of the first reference information entropy stored in the reference entropy storage unit 111 while corresponding to the travelling environment condition corresponding to the re-checked current travelling environment condition of the vehicle, checks whether the re-estimated second criteria information entropy belongs to the values between the upper limit value and the lower limit value of the second reference information entropy stored in the reference entropy storage unit 111 while corresponding to the travelling environment condition corresponding to the re-checked current travelling environment condition of the vehicle, and checks whether the re-estimated third criteria information entropy belongs to the values between the upper limit value and the lower limit value of the third reference information entropy stored in the reference entropy storage unit 111 while corresponding to the travelling environment condition corresponding to the re-checked current travelling environment condition of the vehicle.

Then, when it is checked that any one of the re-estimated first criteria information entropy, the re-estimated second criteria information entropy, and the re-estimated third criteria information entropy does not belong to the values between the upper limit values and the lower limit values of the first reference information entropy, the second reference information entropy, and the third reference information entropy stored while corresponding to the travelling environment condition corresponding to the re-checked current travelling environment condition of the vehicle, the external data intrusion determining unit 116 determines that the external data intrusion occurs on the vehicle.

When it is checked that any one or more of the re-estimated first, second, and third criteria information entropy belong to the values between the upper limit value and the lower limit value of the first, second, and third reference information entropy, the continuous monitoring event generating unit 117 may check that the state of the vehicle is normal, generate the continuous monitoring event again, control the repeated performance of the operations according to the travelling environment condition checking unit 112, the count unit 113, the criteria information entropy estimating unit 114, and the entropy checking unit 115, and re-perform the process of determining whether the external data intrusion occurs on the vehicle. Through the method, the continuous monitoring event generating unit 117 continuously generates the continuous monitoring event whenever it is continuously checked that the external data intrusion does not occur on the vehicle to control the determination whether the external data intrusion occurs on the vehicle to be repeatedly performed.

In this case, the criteria information entropy estimating unit 114 may repeatedly perform the calculation of Equation 10 below whenever the continuous monitoring event is generated to estimate the first, second, and third reference information entropy corresponding to each continuous monitoring event.

$$R_p = -\log_2 \frac{w \sum_{k=2}^{p} w^{p-k} S_{k-1} + S_p}{\left(n_p \times \frac{1}{1-w}\right)} \quad \text{[Equation 10]}$$

Herein, $R_p$ refers to the first, the second, and third criteria information entropy estimated when the continuous monitoring event is generated at the $p^{th}$ time, in which p is a natural number equal to or larger than 2, $S_{k-1}$ refers to the number of times of the occurrence of each of the first, second, and third overlapping events counted when the continuous monitoring event is generated at the k−1th time, $S_p$ refers to the number of times of the occurrence of each of the first, second, and third overlapping events counted when the continuous monitoring event is generated at the $p^{th}$ time, $n_p$ refers to the number of N packets forming the packet group when the continuous monitoring event is generated at the $p^{th}$ time (that is, $n_p$=N), and w refers to a predetermined weighted value having a size between 0 to 1.

According to the exemplary embodiment of the present invention, the apparatus 110 for detecting in-vehicle external data intrusion may further include a danger level table maintaining unit 121, a repeated performance control unit 122, a ratio calculating unit 123, and an alarm message output unit 124.

The danger level table maintaining unit 121 stores and maintains a danger level table in which, for each of a plurality of predetermined different danger levels, a different intrusion determination ratio value range corresponding to each danger level is recorded.

In relation to this, the information represented in Table 2 below may be recorded in the danger level table.

TABLE 2

| Danger levels | Intrusion determination ratio value ranges |
|---|---|
| Safe | 0 to 10% |
| Care | 10 to 30% |
| Danger | 30 to 60% |
| High danger | 60 to 100% |

When it is determined that the external data intrusion occurs on the vehicle through the external data intrusion determining unit 116, the repeated performance control unit 122 controls the repeated performance of the determination whether the external data intrusion occurs on the vehicle the predetermined number of times of the performance of a first re-determination.

When the determination whether the external data intrusion occurs on the vehicle is repeatedly performed the number of times of the performance of the first re-determination, the ratio calculating unit 123 counts the number of times that it is determined that the external data intrusion occurs on the vehicle from the result of the repeated performance of the determination whether the external data intrusion occurs on the vehicle and calculates a ratio of the number of times that it is determined that the external data intrusion occurs on the vehicle to the number of times of the performance of the first re-determination.

The alarm message output unit 124 extracts a first danger level corresponding to a first intrusion determination ratio value range to which the calculated ratio belongs from the danger level table and outputs an alarm message notifying that the state of the vehicle is in a danger situation according to the first danger level through a display.

For example, in the case where the predetermined number of times of the performance of the first re-determination is "8", when it is determined that the external data intrusion occurs on the vehicle as the result of the determination whether the external data intrusion occurs on the vehicle by the external data intrusion determining unit 116, the repeated performance control unit 122 may control the repeated performance of the determination whether the external data intrusion occurs on the vehicle "8 times" that is the number of times of the performance of the first re-determination.

In this case, when the determination whether the external data intrusion occurs on the vehicle is repeatedly performed "8 times" that is the number of times of the performance of the first re-determination, the ratio calculating unit 123 may count the number of times that the external data intrusion occurs on the vehicle from the result of the repeated performance of the determination whether the external data intrusion occurs on the vehicle.

In relation to this, when the number of times that it is determined that the external data intrusion occurs on the vehicle is counted as "5" in total from the result of the repeated performance of the determination whether the external data intrusion occurs on the vehicle, the ratio calculating unit 123 may calculate a ratio of "62.5%" by calculating "5" that is the number of times that it is determined that the external data intrusion occurs on the vehicle to "8" that is the number of times of the performance of the first re-determination.

In this case, the alarm message output unit 124 may extract a danger level "high danger" corresponding to "60 to 100%" that is the first intrusion determination ratio value range to which the calculated ratio of "62.5" belongs from the danger level table represented in Table 2, and output an alarm message notifying a danger situation according to the danger level in which the state of the vehicle is "high danger" through the display.

Figure 2:
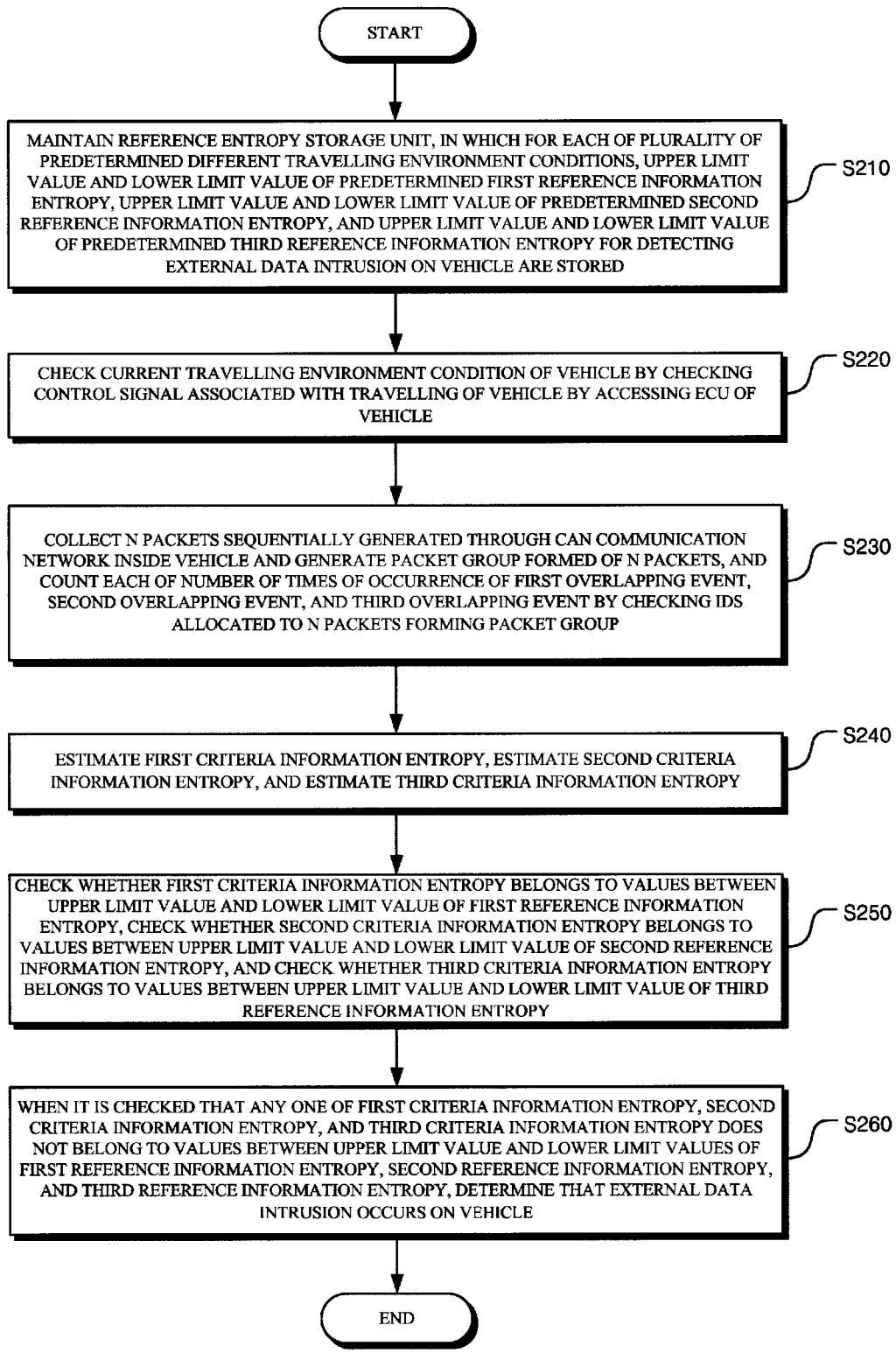
FIG. 2 is a flowchart illustrating a method of operating the apparatus for detecting in-vehicle external data intrusion by comparing multiple information entropy according to an exemplary embodiment of the present invention.

FIG. 2 is a flowchart illustrating a method of operating the apparatus for detecting in-vehicle external data intrusion by comparing multiple information entropy according to an exemplary embodiment of the present invention.

In operation S210, the apparatus maintains a reference entropy storage unit, in which for each of a plurality of predetermined different travelling environment conditions, an upper limit value and a lower limit value of predetermined first reference information entropy, an upper limit value and a lower limit value of predetermined second reference information entropy, and an upper limit value and a lower limit value of predetermined third reference information entropy for detecting external data intrusion on a vehicle are stored.

In operation S220, the apparatus checks a current travelling environment condition of the vehicle by checking a control signal associated with the travelling of the vehicle by accessing an ECU of the vehicle.

In operation S230, the apparatus collects N packets (N is a natural number equal to or larger than 2) sequentially generated through the in-vehicle CAN communication network and generates a packet group formed of N packets, and counts each of the number of times of the occurrence of the first overlapping event (which is the event generated when the two packets having the same ID are continuously generated through the CAN communication network), the second overlapping event (which is the event generated when the three packets having the same ID are continuously generated through the CAN communication network), and the third overlapping event (which is the event generated when the four packets having the same ID are continuously generated through the CAN communication network) by checking IDs allocated to the N packets forming the packet group.

In operation S240, the apparatus estimates first criteria information entropy representing the amount of information for the packet ID generable through the CAN communication network under the current travelling environment condition of the vehicle based on the number of times of the occurrence of the first overlapping event and the number of N packets forming the packet group, estimates second criteria information entropy representing the amount of information for the packet ID generable through the CAN communication network under the current travelling environment condition of the vehicle based on the number of times of the occurrence of the second overlapping event and the number of N packets forming the packet group, and estimates third criteria information entropy representing the amount of information for the packet ID generable through the CAN communication network under the current travelling environment condition of the vehicle based on the number of times of the occurrence of the third overlapping event and the number of N packets forming the packet group.

In operation S250, when the first criteria information entropy, the second criteria information entropy, and the third criteria information entropy are estimated, the apparatus checks whether the first criteria information entropy belongs to values between the upper limit value and the lower limit value of the first reference information entropy stored in the reference entropy storage unit while corresponding to the travelling environment condition corresponding to the current travelling environment condition of the vehicle, checks whether the second criteria information entropy belongs to values between the upper limit value and the lower limit value of the second reference information entropy stored in the reference entropy storage unit while corresponding to the travelling environment condition corresponding to the current travelling environment condition of the vehicle, and checks whether the third criteria information entropy belongs to values between the upper limit value and the lower limit value of the third reference information entropy stored in the reference entropy storage unit while corresponding to the travelling environment condition corresponding to the current travelling environment condition of the vehicle.

In operation S260, when it is checked that any one of the first criteria information entropy, the second criteria information entropy, and the third criteria information entropy does not belong to the values between the upper limit value and the lower limit values of the first reference information entropy, the second reference information entropy, and the third reference information entropy stored while corresponding to the travelling environment condition corresponding to the current travelling environment condition of the vehicle, the apparatus determines that the external data intrusion occurs on the vehicle.

In this case, according to the exemplary embodiment of the present invention, in operation S240, the apparatus may estimate the first criteria information entropy based on a calculation according to Equation 4, estimate the second criteria information entropy based on a calculation according to Equation 5, and estimate the third criteria information entropy based on a calculation according to Equation 6.

According to the exemplary embodiment of the present invention, the method of operating the apparatus for detecting in-vehicle external data intrusion may further include generating a continuous monitoring event when it is checked that any one of the first criteria information entropy, the second criteria information entropy, and the third criteria information entropy belongs to the values between the upper limit value and the lower limit values of the first reference information entropy, the second reference information entropy, and the third reference information entropy stored while corresponding to the travelling environment condition corresponding to the current travelling environment condition of the vehicle, when the continuous monitoring event is generated, checking a control signal associated with the travelling of the vehicle by accessing the ECU of the vehicle again to re-check the current travelling environment condition of the vehicle, re-collecting N packets additionally generated through the CAN communication network and regenerating a packet group formed of the re-collected N packets, and checking IDs allocated to the N packets forming the regenerated packet group and counting the number of times of the occurrence of each of the first overlapping event, the second overlapping event, and the third overlapping event, re-estimating the first criteria information entropy representing the amount of information for the packet ID generable through the CAN communication network under the re-checked current travelling environment condition of the vehicle based on the re-counted number of times of the occurrence of the first overlapping event and the number of N packets forming the re-generated packet group, re-estimating the second criteria information entropy representing the amount of information for the packet ID generable through the CAN communication network under the re-checked current travelling environment condition of the vehicle based on the re-counted number of times of the occurrence of the second overlapping event and the number of N packets forming the re-generated packet group, and re-estimating the third criteria information entropy representing the amount of information for the packet ID generable through the CAN communication network under the re-checked current travelling environment condition of the vehicle based on the re-counted number of times of the occurrence of the third overlapping event and the number of N packets forming the re-generated packet group, when the first criteria information entropy, the second criteria information entropy, and the third criteria information entropy are re-estimated, checking whether the re-estimated first criteria information entropy belongs to the values between the upper limit value and the lower limit value of the first reference information entropy stored in the reference entropy storage unit while corresponding to the travelling environment condition corresponding to the re-checked current travelling environment condition of the vehicle, checking whether the re-estimated second criteria information entropy belongs to the values between the upper limit value and the lower limit value of the second reference information entropy stored in the reference entropy storage unit while corresponding to the travelling environment condition corresponding to the re-checked current travelling environment condition of the vehicle, and checking whether the re-estimated third criteria information entropy belongs to the values between the upper limit value and the lower limit value of the third reference information entropy stored in the reference entropy storage unit while corresponding to the travelling environment condition corresponding to the re-checked current travelling environment condition of the vehicle, and when it is checked that any one of the re-estimated first criteria information entropy, the re-estimated second criteria information entropy, and the re-estimated third criteria information entropy does not belong to the values between the upper limit values and the lower limit values of the first reference information entropy, the second reference information entropy, and the third reference information entropy stored while corresponding to the travelling environment condition corresponding to the re-checked current travelling environment condition of the vehicle, determining that the external data intrusion occurs on the vehicle.

In this case, according to the exemplary embodiment of the present invention, in the re-estimating of the third criteria information entropy, the first criteria information entropy may be re-estimated based on a calculation according to Equation 7, the second criteria information entropy may be re-estimated based on a calculation according to Equation 8, and the third criteria information entropy may be re-estimated based on a calculation according to Equation 9.

According to the exemplary embodiment of the present invention, the method of operating the apparatus for detecting in-vehicle external data intrusion may further include repeatedly performing simulation travelling according to each of the plurality of travelling environment conditions on the vehicle as many as the predetermined number of times of a training by applying a control signal to the ECU of the vehicle so as to have a travelling environment according to each of the plurality of travelling environment conditions, counting the total number of plurality of packets sequentially generated through the CAN communication network and the number of times of occurrence of a first overlapping event, a second overlapping event, and a third overlapping event generated for the plurality of packets whenever the simulation travelling is repeatedly performed the predetermined number of times of the training for each of the plurality of travelling environment conditions, estimating first for-test information entropy representing the amount of information for a packet ID generable through the CAN communication network according to each of the plurality of travelling environment conditions based on the number of times of the occurrence of the first overlapping event, estimating second for-test information entropy representing the amount of information for a packet ID generable through the CAN communication network according to each of the plurality of travelling environment conditions based on the number of times of the occurrence of the second overlapping event, and estimating third for-test information entropy representing the amount of information for a packet ID generable through the CAN communication network according to each of the plurality of travelling environment conditions based on the number of times of the occurrence of the third overlapping event, and checking maximum values and minimum values of the first for-test information entropy, the second for-test information entropy, and the third for-test information entropy repeatedly estimated by the predetermined number of times of the training for each of the plurality of travelling environment conditions, and corresponding the maximum value and the minimum value of the first for-test information entropy checked for each of the plurality of travelling environment conditions to the upper limit value and the lower limit value of the first reference information entropy for each of the plurality of travelling environment conditions and storing the maximum value and the minimum value of the first for-test information entropy in the reference entropy storage unit, corresponding the maximum value and the minimum value of the second for-test information entropy checked for each of the plurality of travelling environment conditions to the upper limit value and the lower limit value of the second reference information entropy checked for each of the plurality of travelling environment conditions and storing the maximum value and the minimum value of the second for-test information entropy in the reference entropy storage unit, and corresponding the maximum value and the minimum value of the third for-test information entropy checked for each of the plurality of travelling environment conditions to the upper limit value and the lower limit value of the third reference information entropy for each of the plurality of travelling environment conditions and storing the maximum value and the minimum value of the third for-test information entropy in the reference entropy storage unit.

According to the exemplary embodiment of the present invention, the method of operating the apparatus for detecting in-vehicle external data intrusion may further include storing and maintaining a danger level table in which, for each of a plurality of predetermined different danger levels, a different intrusion determination ratio value range corresponding to each danger level is recorded, when it is determined that the external data intrusion occurs on the vehicle, controlling the repeated performance of the determination whether the external data intrusion occurs on the vehicle the predetermined number of times of the performance of a first re-determination, when the determination whether the external data intrusion occurs on the vehicle is repeatedly performed the number of times of the performance of the first re-determination, counting the number of times that it is determined that the external data intrusion occurs on the vehicle from the result of the repeated performance of the determination whether the external data intrusion occurs on the vehicle and calculating a ratio of the number of times that it is determined that the external data intrusion occurs on the vehicle to the number of times of the performance of the first re-determination, and extracting a first danger level corresponding to a first intrusion determination ratio value range to which the calculated ratio belongs from the danger level table and outputting an alarm message notifying that the state of the vehicle is a danger situation according to the first danger level through a display.

In the foregoing, the method of operating the apparatus for detecting in-vehicle external data intrusion by comparing multiple information entropy according to the exemplary embodiment of the present invention has been described with reference to FIG. 2. Herein, the method of operating the apparatus for detecting in-vehicle external data intrusion by comparing multiple information entropy according to the exemplary embodiment of the present invention may correspond to the configuration of the operation of the apparatus 110 for detecting in-vehicle external data intrusion by comparing multiple information entropy described with reference to FIG. 1, so that a more detailed description thereof will be omitted.

The method of operating the apparatus for detecting in-vehicle external data intrusion by comparing multiple information entropy according to the exemplary embodiment of the present invention may be implemented by a computer program stored in a storage medium for executing the computer program through a combination with a computer.

The method of operating the apparatus for detecting in-vehicle external data intrusion by comparing multiple information entropy according to the exemplary embodiment of the present invention may be implemented in the form of a program command executable through various computer means and be recorded in a computer readable medium. The computer readable medium may include solely or a combination of a program command, a data file, a data structure, and the like. The program command recorded in the medium may be specially designed and configured for the present invention or may be published to those skilled in the computer software and usable. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. An apparatus for detecting in-vehicle external data intrusion by comparing multiple information entropy, the apparatus comprising a processor configured to:
   store, for each of a plurality of travelling environment conditions, an upper limit value and a lower limit value of predetermined first reference information entropy, an upper limit value and a lower limit value of predetermined second reference information entropy, and an upper limit value and a lower limit value of predetermined third reference information entropy for detecting external data intrusion on a vehicle, in the apparatus;
   check a control signal associated with travelling of the vehicle by accessing an Electronic Control Unit (ECU) of the vehicle and check a current travelling environment condition of the vehicle;
   collect N packets (N is a natural number equal to or larger than 2) sequentially generated through an in-vehicle Controller Area Network (CAN) communication network and generate a packet group formed of the N packets, and count each of the number of times of occurrence of a first overlapping event, a second overlapping event, and a third overlapping event by checking packet identifiers (IDs) allocated to the N packets forming the packet group, wherein the first overlapping event is generated when two packets having a same packet ID are continuously generated through the CAN communication network, the second overlapping event is generated when three packets having a same packet ID are continuously generated through the CAN communication network, and the third overlapping event is generated when four packets having a same packet ID are continuously generated through the CAN communication network;
   estimate first criteria information entropy representing a quantity of information for first packet IDs generable through the CAN communication network under the current travelling environment condition of the vehicle based on the number of times of the occurrence of the first overlapping event and the number of N packets forming the packet group, estimate second criteria information entropy representing a quantity of information for second packet IDs generable through the CAN communication network under the current travelling environment condition of the vehicle based on the number of times of the occurrence of the second overlapping event and the number of N packets forming the packet group, and estimate third criteria information entropy representing a quantity of information for third packet IDs generable through the CAN communication network under the current travelling environment condition of the vehicle based on the number of times of the occurrence of the third overlapping event and the number of N packets forming the packet group;
   when the first criteria information entropy, the second criteria information entropy, and the third criteria information entropy are estimated, check whether the first criteria information entropy belongs to values between the upper limit value and the lower limit value of the first reference information entropy stored in the apparatus while corresponding to a travelling environment condition corresponding to the current travelling environment condition of the vehicle, check whether the second criteria information entropy belongs to values between the upper limit value and the lower limit value of the second reference information entropy stored in the apparatus while corresponding to the travelling environment condition corresponding to the current travelling environment condition of the vehicle, and check whether the third criteria information entropy belongs to values between the upper limit value and the lower limit value of the third reference information entropy stored in the apparatus while corresponding to the travelling environment condition corresponding to the current travelling environment condition of the vehicle; and when it is checked that any one of the first criteria information entropy, the second criteria information entropy, and the third criteria information entropy does not belong to the values between the upper limit value and the lower limit values of the first reference information entropy, the second reference information entropy, and the third reference information entropy stored while corresponding to the travelling environment condition corresponding to the current travelling environment condition of the vehicle, determine that the external data intrusion occurs on the vehicle.

2. The apparatus of claim 1, wherein the processor estimates the first criteria information entropy based on a calculation according to Equation 1 below, estimates the second criteria information entropy based on a calculation according to Equation 2 below, and estimates the third criteria information entropy based on a calculation according to Equation 3 below, $$R_1 = -\log_2 \frac{S_1}{n_1} \quad \text{[Equation 1]}$$

$$R_2 = -\log_2 \frac{S_2}{n_1} \quad \text{[Equation 2]}$$

$$R_3 = -\log_2 \frac{S_3}{n_1} \quad \text{[Equation 3]}$$

herein, $R_1$ refers to the first criteria information entropy, $S_1$ refers to the number of times of the occurrence of the first overlapping event, $n_1$ refers to the number of N packets forming the packet group, $R_2$ refers to the second criteria information entropy, $S_2$ refers to the number of times of the occurrence of the second overlapping event, $R_3$ refers to the third criteria information entropy, and $S_3$ refers to the number of times of the occurrence of the third overlapping event.

3. The apparatus of claim 1, wherein the processor is further configured to:

when it is checked that any one of the first criteria information entropy, the second criteria information entropy, and the third criteria information entropy belongs to the values between the upper limit value and the lower limit values of the first reference information entropy, the second reference information entropy, and the third reference information entropy stored while corresponding to the travelling environment condition corresponding to the current travelling environment condition of the vehicle, generate a continuous monitoring event, wherein when the continuous monitoring event is generated, the processor checks the control signal associated with the travelling of the vehicle by accessing the ECU of the vehicle again to re-check the current travelling environment condition of the vehicle, the processor re-collects N packets additionally generated through the CAN communication network and regenerates a packet group formed of the re-collected N packets, and checks IDs allocated to the N packets forming the regenerated packet group and counts the number of times of the occurrence of each of the first overlapping event, the second overlapping event, and the third overlapping event again, the processor re-estimates the first criteria information entropy representing a quantity of information for fourth packet IDs generable through the CAN communication network under the re-checked current travelling environment condition of the vehicle based on the re-counted number of times of the occurrence of the first overlapping event and the number of N packets forming the re-generated packet group, re-estimates the second criteria information entropy representing a quantity of information for fifth packet IDs generable through the CAN communication network under the re-checked current travelling environment condition of the vehicle based on the re-counted number of times of the occurrence of the second overlapping event and the number of N packets forming the re-generated packet group, and re-estimates the third criteria information entropy representing a quantity of information for sixth packet IDs generable through the CAN communication network under the re-checked current travelling environment condition of the vehicle based on the re-counted number of times of the occurrence of the third overlapping event and the number of N packets forming the re-generated packet group, when the first criteria information entropy, the second criteria information entropy, and the third criteria information entropy are re-estimated, the processor checks whether the re-estimated first criteria information entropy belongs to the values between the upper limit value and the lower limit value of the first reference information entropy stored in the apparatus while corresponding to the travelling environment condition corresponding to the re-checked current travelling environment condition of the vehicle, checks whether the re-estimated second criteria information entropy belongs to the values between the upper limit value and the lower limit value of the second reference information entropy stored in the apparatus while corresponding to the travelling environment condition corresponding to the re-checked current travelling environment condition of the vehicle, and checks whether the re-estimated third criteria information entropy belongs to the values between the upper limit value and the lower limit value of the third reference information entropy stored in the apparatus while corresponding to the travelling environment condition corresponding to the re-checked current travelling environment condition of the vehicle, and when it is checked that any one of the re-estimated first criteria information entropy, the re-estimated second criteria information entropy, and the re-estimated third criteria information entropy does not belong to the values between the upper limit values and the lower limit values of the first reference information entropy, the second reference information entropy, and the third reference information entropy stored while corresponding to the travelling environment condition corresponding to the re-checked current travelling environment condition of the vehicle, the processor determines that the external data intrusion occurs on the vehicle.

4. The apparatus claim 3, wherein the processor re-estimates the first criteria information entropy based on a calculation according to Equation 4 below, re-estimates the second criteria information entropy based on a calculation according to Equation 5 below, and re-estimates the third criteria information entropy based on a calculation according to Equation 6 below, $$R_{1r} = -\log_2 \frac{wS_1 + S_{1r}}{\left(n_2 \times \frac{1}{1-w}\right)} \quad \text{[Equation 4]}$$

$$R_{2r} = -\log_2 \frac{wS_2 + S_{2r}}{\left(n_2 \times \frac{1}{1-w}\right)} \quad \text{[Equation 5]}$$

$$R_{3r} = -\log_2 \frac{wS_3 + S_{3r}}{\left(n_2 \times \frac{1}{1-w}\right)} \quad \text{[Equation 6]}$$

herein, $R_{1r}$ refers to the re-estimated first criteria information entropy, $S_1$ refers to the number of times of the occurrence of the first overlapping event, $S_{1r}$ refers to the re-counted number of times of the occurrence of the first overlapping event, $n_2$ refers to the number of N packets forming the re-generated packet group, $R_{2r}$ refers to the re-estimated second criteria information entropy, $S_2$ refers to the number of times of the occurrence of the second overlapping event, $S_{2r}$ refers to the re-counted number of times of the occurrence of the second overlapping event, $R_{3r}$ refers to the re-estimated third criteria information entropy, $S_3$ refers to the number of times of the occurrence of the third overlapping event, $S_{3r}$ refers to the re-counted number of times of the occurrence of the third overlapping event, and w refers to a predetermined weight having a size between 0 to 1.

5. The apparatus of claim 1, the processor is further configured to:

repeatedly perform simulation travelling according to each of the plurality of travelling environment conditions on the vehicle as many as the predetermined number of times of a training by applying a control signal to the ECU of the vehicle so as to have a travelling environment according to each of the plurality of travelling environment conditions;

count the total number of plurality of packets sequentially generated through the CAN communication network inside the vehicle and the number of times of occurrence of a fourth overlapping event, a fifth overlapping event, and a sixth overlapping event generated for the plurality of packets whenever the simulation travelling is repeatedly performed the predetermined number of times of the training for each of the plurality of travelling environment conditions, and estimate first for-test information entropy representing a quantity of information for fourth packet IDs generable through the CAN communication network according to each of the plurality of travelling environment conditions based on the number of times of the occurrence of the fourth overlapping event, estimate second for-test information entropy representing a quantity of information for fifth packet IDs generable through the CAN communication network according to each of the plurality of travelling environment conditions based on the number of times of the occurrence of the fifth overlapping event, and estimate third for-test information entropy representing a quantity of information for sixth packet IDs generable through the CAN communication network according to each of the plurality of travelling environment conditions based on the number of times of the occurrence of the sixth overlapping event; and check maximum values and minimum values of the first for-test information entropy, the second for-test information entropy, and the third for-test information entropy repeatedly estimated by the predetermined number of times of the training for each of the plurality of travelling environment conditions, and correspond the maximum value and the minimum value of the first for-test information entropy checked for each of the plurality of travelling environment conditions to the upper limit value and the lower limit value of the first reference information entropy for each of the plurality of travelling environment conditions and store the maximum value and the minimum value of the first for-Lest information entropy in the apparatus, correspond the maximum value and the minimum value of the second for-test information entropy checked for each of the plurality of travelling environment conditions to the upper limit value and the lower limit value of the second reference information entropy checked for each of the plurality of travelling environment conditions and store the maximum value and the minimum value of the second for-test information entropy in the apparatus, and correspond the maximum value and the minimum value of the third for-test information entropy checked for each of the plurality of travelling environment conditions to the upper limit value and the lower limit value of the third reference information entropy for each of the plurality of travelling environment conditions and store the maximum value and the minimum value of the third for-test information entropy in the apparatus, wherein the fourth overlapping event is generated when two packets having a same packet ID are continuously generated through the CAN communication network, the fifth overlapping event is generated when three packets having a same packet ID are continuously generated through the CAN communication network, and the sixth overlapping event is generated when four packets having a same packet ID are continuously generated through the CAN communication network.

6. The apparatus of claim 1, wherein the processor is further configured to:

store and maintain a danger level table in which, for each of a plurality of predetermined different danger levels, a different intrusion determination ratio value range corresponding to each danger level is recorded;

when it is determined that the external data intrusion occurs on the vehicle through the processor, control the repeated performance of the determination whether the external data intrusion occurs on the vehicle the predetermined number of times of the performance of a first re-determination;

when the determination whether the external data intrusion occurs on the vehicle is repeatedly performed the number of times of the performance of the first re-determination, count the number of times that it is determined that the external data intrusion occurs on the vehicle from the result of the repeated performance of the determination whether the external data intrusion occurs on the vehicle and calculate a ratio of the number of times that it is determined that the external data intrusion occurs on the vehicle to the number of times of the performance of the first re-determination; and extract a first danger level corresponding to a first intrusion determination ratio value range to which the calculated ratio belongs from the danger level table and output an alarm message notifying that the state of the vehicle is a danger situation according to the first danger level through a display.

7. A method of operating an apparatus for detecting in-vehicle external data intrusion by comparing multiple information entropy, the method comprising:
maintaining the apparatus in which for each of a plurality of travelling environment conditions, an upper limit value and a lower limit value of predetermined first reference information entropy, an upper limit value and a lower limit value of predetermined second reference information entropy, and an upper limit value and a lower limit value of predetermined third reference information entropy for detecting external data intrusion on a vehicle are stored;
checking a control signal associated with travelling of the vehicle by accessing an Electronic Control Unit (ECU) of the vehicle and checking a current travelling environment condition of the vehicle;
collecting N packets (N is a natural number equal to or larger than 2) sequentially generated through an in-vehicle Controller Area Network (CAN) communication network and generating a packet group formed of the N packets, and counting each of the number of times of occurrence of a first overlapping event, a second overlapping event, and a third overlapping event by checking packet identifiers (IDs) allocated to the N packets forming the packet group, wherein the first overlapping event is generated when two packets having a same packet ID are continuously generated through the CAN communication network, the second overlapping event is generated when three packets having a same packet ID are continuously generated through the CAN communication network, and the third overlapping event is generated when four packets having a same packet ID are continuously generated through the CAN communication network;
estimating first criteria information entropy representing a quantity of information for first packet IDs generable through the CAN communication network under the current travelling environment condition of the vehicle based on the number of times of the occurrence of the first overlapping event and the number of N packets forming the packet group, estimating second criteria information entropy representing a quantity of information for second packet IDs generable through the CAN communication network under the current travelling environment condition of the vehicle based on the number of times of the occurrence of the second overlapping event and the number of N packets forming the packet group, and estimating third criteria information entropy representing a quantity of information for third packet IDs ID generable through the CAN communication network under the current travelling environment condition of the vehicle based on the number of times of the occurrence of the third overlapping event and the number of N packets forming the packet group;
when the first criteria information entropy, the second criteria information entropy, and the third criteria information entropy are estimated, checking whether the first criteria information entropy belongs to values between the upper limit value and the lower limit value of the first reference information entropy stored in the apparatus while corresponding to a travelling environment condition corresponding to the current travelling environment condition of the vehicle, checking whether the second criteria information entropy belongs to values between the upper limit value and the lower limit value of the second reference information entropy stored in the apparatus while corresponding to the travelling environment condition corresponding to the current travelling environment condition of the vehicle, and checking whether the third criteria information entropy belongs to values between the upper limit value and the lower limit value of the third reference information entropy stored in the apparatus while corresponding to the travelling environment condition corresponding to the current travelling environment condition of the vehicle; and
when it is checked that any one of the first criteria information entropy, the second criteria information entropy, and the third criteria information entropy does not belong to the values between the upper limit value and the lower limit values of the first reference information entropy, the second reference information entropy, and the third reference information entropy stored while corresponding to the travelling environment condition corresponding to the current travelling environment condition of the vehicle, determining that the external data intrusion occurs on the vehicle.

8. The method of claim 7, wherein the estimating of the third criteria information entropy includes estimating the first criteria information entropy based on a calculation according to Equation 1 below, estimating the second criteria information entropy based on a calculation according to Equation 2 below, and estimating the third criteria information entropy based on a calculation according to Equation 3 below, $$R_1 = -\log_2 \frac{S_1}{n_1} \qquad \text{[Equation 1]}$$

$$R_2 = -\log_2 \frac{S_2}{n_1} \qquad \text{[Equation 2]}$$

$$R_3 = -\log_2 \frac{S_3}{n_1} \qquad \text{[Equation 3]}$$

herein, $R_1$ refers to the first criteria information entropy, $S_1$ refers to the number of times of the occurrence of the first overlapping event, $n_1$ refers to the number of N packets forming the packet group, $R_2$ refers to the second criteria information entropy, $S_2$ refers to the number of times of the occurrence of the second overlapping event, $R_3$ refers to the third criteria information entropy, and $S_3$ refers to the number of times of the occurrence of the third overlapping event.

9. The method of claim 7, further comprising:
when it is checked that any one of the first criteria information entropy, the second criteria information entropy, and the third criteria information entropy belongs to the values between the upper limit value and the lower limit values of the first reference information entropy, the second reference information entropy, and the third reference information entropy stored while corresponding to the travelling environment condition corresponding to the current travelling environment condition of the vehicle, generating a continuous monitoring event;
wherein when the continuous monitoring event is generated, checking the control signal associated with the travelling of the vehicle by accessing the ECU of the vehicle again to re-check the current travelling environment condition of the vehicle;
re-collecting N packets additionally generated through the CAN communication network and regenerating a packet group formed of the re-collected N packets, and checking IDs allocated to the N packets forming the regenerated packet group and counting the number of times of the occurrence of each of the first overlapping event, the second overlapping event, and the third overlapping event again;
re-estimating the first criteria information entropy representing a quantity of information for fourth packet IDs generable through the CAN communication network under the re-checked current travelling environment condition of the vehicle based on the re-counted number of times of the occurrence of the first overlapping event and the number of N packets forming the re-generated packet group, re-estimating the second criteria information entropy representing a quantity of information for fifth packet IDs generable through the CAN communication network under the re-checked current travelling environment condition of the vehicle based on the re-counted number of times of the occurrence of the second overlapping event and the number of N packets forming the re-generated packet group, and re-estimating the third criteria information entropy representing a quantity of information for sixth packet IDs generable through the CAN communication network under the re-checked current travelling environment condition of the vehicle based on the re-counted number of times of the occurrence of the third overlapping event and the number of N packets forming the re-generated packet group;
when the first criteria information entropy, the second criteria information entropy, and the third criteria information entropy are re-estimated, checking whether the re-estimated first criteria information entropy belongs to the values between the upper limit value and the lower limit value of the first reference information entropy stored in the apparatus while corresponding to the travelling environment condition corresponding to the re-checked current travelling environment condition of the vehicle, checking whether the re-estimated second criteria information entropy belongs to the values between the upper limit value and the lower limit value of the second reference information entropy stored in the apparatus while corresponding to the travelling environment condition corresponding to the re-checked current travelling environment condition of the vehicle, and checking whether the re-estimated third criteria information entropy belongs to the values between the upper limit value and the lower limit value of the third reference information entropy stored in the apparatus while corresponding to the travelling environment condition corresponding to the re-checked current travelling environment condition of the vehicle, and
when it is checked that any one of the re-estimated first criteria information entropy, the re-estimated second criteria information entropy, and the re-estimated third criteria information entropy does not belong to the values between the upper limit values and the lower limit values of the first reference information entropy, the second reference information entropy, and the third reference information entropy stored while corresponding to the travelling environment condition corresponding to the re-checked current travelling environment condition of the vehicle, determining that the external data intrusion occurs on the vehicle.

10. The method of claim 9, wherein the re-estimating of the third criteria information entropy includes re-estimating the first criteria information entropy based on a calculation according to Equation 4 below, re-estimating the second criteria information entropy based on a calculation according to Equation 5 below, and re-estimating the third criteria information entropy based on a calculation according to Equation 6 below, $$R_{1r} = -\log_2 \frac{wS_1 + S_{1r}}{\left(n_2 \times \frac{1}{1-w}\right)}$$ [Equation 4]

$$R_{2r} = -\log_2 \frac{wS_2 + S_{2r}}{\left(n_2 \times \frac{1}{1-w}\right)}$$ [Equation 5]

$$R_{3r} = -\log_2 \frac{wS_3 + S_{3r}}{\left(n_2 \times \frac{1}{1-w}\right)}$$ [Equation 6]

herein, $R_{1r}$ refers to the re-estimated first criteria information entropy, $S_1$ refers to the number of times of the occurrence of the first overlapping event, $S_{1r}$ refers to the re-counted number of times of the occurrence of the first overlapping event, $n_2$ refers to the number of N packets forming the re-generated packet group, $R_{2r}$ refers to the re-estimated second criteria information entropy, $S_2$ refers to the number of times of the occurrence of the second overlapping event, $S_{2r}$ refers to the re-counted number of times of the occurrence of the second overlapping event, $R_{3r}$ refers to the re-estimated third criteria information entropy, $S_3$ refers to the number of times of the occurrence of the third overlapping event, $S_{3r}$ refers to the re-counted number of times of the occurrence of the third overlapping event, and w refers to a predetermined weight having a size between 0 to 1.

11. The method of claim 7, further comprising:
repeatedly performing simulation travelling according to each of the plurality of travelling environment conditions on the vehicle as many as the predetermined number of times of a training by applying a control signal to the ECU of the vehicle so as to have a travelling environment according to each of the plurality of travelling environment conditions;
counting the total number of plurality of packets sequentially generated through the CAN communication network and the number of times of occurrence of a fourth overlapping event, a fifth overlapping event, and a sixth overlapping event generated for the plurality of packets whenever the simulation travelling is repeatedly performed the predetermined number of times of the training for each of the plurality of travelling environment conditions, and estimating first for-test information entropy representing a quantity of information for fourth packet IDs generable through the CAN communication network according to each of the plurality of travelling environment conditions based on the number of times of the occurrence of the fourth overlapping event, estimating second for-test information entropy representing a quantity of information for fifth packet IDs generable through the CAN communication network according to each of the plurality of travelling environment conditions based on the number of times of the occurrence of the fifth overlapping event, and estimating third for-test information entropy representing a quantity of information for sixth packet IDs generable through the CAN communication network according to each of the plurality of travelling environment conditions based on the number of times of the occurrence of the sixth overlapping event; and checking maximum values and minimum values of the first for-Lest information entropy, the second for-test information entropy, and the third for-test information entropy repeatedly estimated by the predetermined number of times of the training for each of the plurality of travelling environment conditions, and corresponding the maximum value and the minimum value of the first for-test information entropy checked for each of the plurality of travelling environment conditions to the upper limit value and the lower limit value of the first reference information entropy for each of the plurality of travelling environment conditions and storing the maximum value and the minimum value of the first for-test information entropy in the apparatus, corresponding the maximum value and the minimum value of the second for-test information entropy checked for each of the plurality of travelling environment conditions to the upper limit value and the lower limit value of the second reference information entropy checked for each of the plurality of travelling environment conditions and storing the maximum value and the minimum value of the second for-test information entropy in the apparatus, and corresponding the maximum value and the minimum value of the third for-test information entropy checked for each of the plurality of travelling environment conditions to the upper limit value and the lower limit value of the third reference information entropy checked for each of the plurality of travelling environment conditions and storing the maximum value and the minimum value of the third for-test information entropy in the apparatus, wherein the fourth overlapping event is generated when two packets having a same packet ID are continuously generated through the CAN communication network, the fifth overlapping event is generated when three packets having a same packet ID are continuously generated through the CAN communication network, and the sixth overlapping event is generated when four packets having a same packet ID are continuously generated through the CAN communication network.

12. The method of claim 7, further comprising:

storing and maintaining a danger level table in which, for each of a plurality of predetermined different danger levels, a different intrusion determination ratio value range corresponding to each danger level is recorded;

when it is determined that the external data intrusion occurs on the vehicle, controlling the repeated performance of the determination whether the external data intrusion occurs on the vehicle the predetermined number of times of the performance of a first re-determination;

when the determination whether the external data intrusion occurs on the vehicle is repeatedly performed the number of times of the performance of the first re-determination, counting the number of times that it is determined that the external data intrusion occurs on the vehicle from the result of the repeated performance of the determination whether the external data intrusion occurs on the vehicle and calculating a ratio of the number of times that it is determined that the external data intrusion occurs on the vehicle to the number of times of the performance of the first re-determination; and extracting a first danger level corresponding to a first intrusion determination ratio value range to which the calculated ratio belongs from the danger level table and outputting an alarm message notifying that the state of the vehicle is a danger situation according to the first danger level through a display.

13. A non-transitory computer readable recording medium having a program recorded therein for allowing a computer to execute a method of operating an apparatus for detecting in-vehicle external data intrusion by comparing multiple information entropy, the method comprising:

maintaining the apparatus in which for each of a plurality of travelling environment conditions, an upper limit value and a lower limit value of predetermined first reference information entropy, an upper limit value and a lower limit value of predetermined second reference information entropy, and an upper limit value and a lower limit value of predetermined third reference information entropy for detecting external data intrusion on a vehicle are stored;

checking a control signal associated with travelling of the vehicle by accessing an Electronic Control Unit (ECU) of the vehicle and checking a current travelling environment condition of the vehicle;

collecting N packets (N is a natural number equal to or larger than 2) sequentially generated through an in-vehicle Controller Area Network (CAN) communication network and generating a packet group formed of the N packets, and counting each of the number of times of occurrence of a first overlapping event, a second overlapping event, and a third overlapping event by checking packet identifiers (IDs) allocated to the N packets forming the packet group, wherein the first overlapping event is generated when two packets having a same packet ID are continuously generated through the CAN communication network, the second overlapping event is generated when three packets having a same packet ID are continuously generated through the CAN communication network, and the third overlapping event is generated when four packets having a same packet ID are continuously generated through the CAN communication network;

estimating first criteria information entropy representing a quantity of information for first packet IDs generable through the CAN communication network under the current travelling environment condition of the vehicle based on the number of times of the occurrence of the first overlapping event and the number of N packets forming the packet group, estimating second criteria information entropy representing a quantity of information for second packet IDs generable through the CAN communication network under the current travelling environment condition of the vehicle based on the number of times of the occurrence of the second overlapping event and the number of N packets forming the packet group, and estimating third criteria information entropy representing a quantity of information for third packet IDs generable through the CAN communication network under the current travelling environment condition of the vehicle based on the number of times of the occurrence of the third overlapping event and the number of N packets forming the packet group;

when the first criteria information entropy, the second criteria information entropy, and the third criteria information entropy are estimated, checking whether the first criteria information entropy belongs to values between the upper limit value and the lower limit value of the first reference information entropy stored in the apparatus while corresponding to a travelling environment condition corresponding to the current travelling environment condition of the vehicle, checking whether the second criteria information entropy belongs to values between the upper limit value and the lower limit value of the second reference information entropy stored in the apparatus while corresponding to the travelling environment condition corresponding to the current travelling environment condition of the vehicle, and checking whether the third criteria information entropy belongs to values between the upper limit value and the lower limit value of the third reference information entropy stored in the apparatus while corresponding to the travelling environment condition corresponding to the current travelling environment condition of the vehicle; and when it is checked that any one of the first criteria information entropy, the second criteria information entropy, and the third criteria information entropy does not belong to the values between the upper limit value and the lower limit values of the first reference information entropy, the second reference information entropy, and the third reference information entropy stored while corresponding to the travelling environment condition corresponding to the current travelling environment condition of the vehicle, determining that the external data intrusion occurs on the vehicle.

* * * * *